United States Patent [19]

Moore

[11] Patent Number: 5,037,465
[45] Date of Patent: Aug. 6, 1991

[54] PLUNGER MECHANISM WITH A SELF-CONTAINED POSITIONING DEVICE

[75] Inventor: Geoffrey B. Moore, Grenoside, United Kingdom

[73] Assignee: Emhart Industries, Inc., Towson, Md.

[21] Appl. No.: 622,421

[22] Filed: Dec. 4, 1990

[30] Foreign Application Priority Data

Jan. 23, 1990 [GB] United Kingdom ............... 9001534

[51] Int. Cl.⁵ ............................................. C03B 11/06
[52] U.S. Cl. ........................................ 65/172; 65/362
[58] Field of Search ................ 65/362, 356, 319, 323, 65/83, 322, 172, 173, 111, 267, 268, 348

[56] References Cited

U.S. PATENT DOCUMENTS 3,314,775  4/1967  de Shetler .......................... 65/319

Primary Examiner—Richard V. Fisher
Assistant Examiner—John M. Hoffmann
Attorney, Agent, or Firm—Spencer T. Smith

[57] ABSTRACT

A plunger operating mechanism for forming parisons in a glassware forming machine comprises a piston and a positioning unit for determining the position of the plunger in its loading and invert positions, the positioning unit being held removable from the mechanism as a unit.

3 Claims, 1 Drawing Sheet

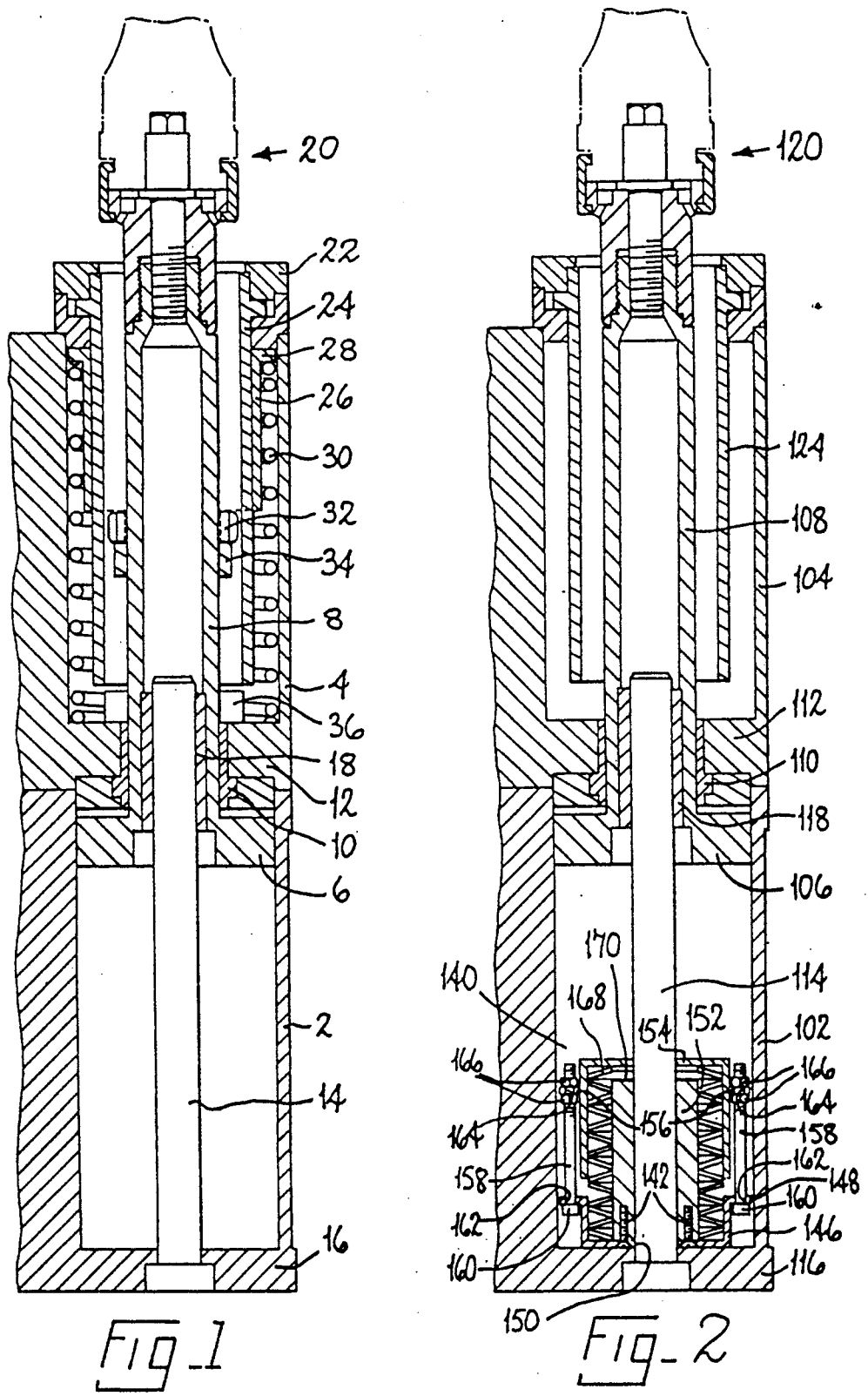
Fig_1 PRIOR ART
Fig_2

PLUNGER MECHANISM WITH A SELF-CONTAINED POSITIONING DEVICE

BACKGROUND OF THE INVENTION

This invention relates to a plunger operating mechanism for operating a parison plunger in an I.S. type glassware forming machine.

In the production of glass containers by the press and blow method on the well known I.S. type machine, a gob of glass is provided to a parison mould, which is then closed, and the glass is pressed into the required shape of a parison by a plunger moving upwardly into the mould, a lower portion of the glass being forced into a neck ring of the parison mould. The plunger is then withdrawn and the parison is carried by the neck ring away from the parison moulding station, and is transferred to a blow mould station at which it is blown into the required shape.

Known plunger mechanisms incorporate a powerful spring, and movement of the plunger into its lower most position, in which it is out of the way of the parison to allow the parison to be moved from the parison moulding station, requires compression of this spring. When the mechanism has to be adjusted, on change of the parison mould, it is necessary to remove a spacer from inside the mechanism and replace it, which can be difficult. Further, on disassembly of the mechanism it is necessary to release the spring in the mechanism which is an awkward and somewhat dangerous operation necessitating the use of a special tool.

It is an object of the present invention to provide a plunger operating mechanism which may be more easily adjusted.

SUMMARY OF THE INVENTION

The present invention provides a plunger operating mechanism for a parison forming plunger of a glassware forming machine comprising a cylinder a piston operating in the cylinder and carrying an actuating rod extending upwardly from the cylinder and adapted to support a parison forming plunger a positioning unit located in a lower end portion of the cylinder and comprising spring means and a stop member capable of limited axial movement against the spring means means for moving the piston in the cylinder between an uppermost, pressing position in which the piston is in an upper end portion of the cylinder, an intermediate, loading, position, in which the piston abuts against the stop member without compression of the spring means and a lowermost, invert position in which the stop member is moved downwardly by the piston through said limited axial movement the positioning unit being removable, without disassembly thereof from the cylinder.

BRIEF DESCRIPTION OF THE DRAWINGS

FIG. 1 shows, diagrammatically, a known plunger operating mechanism,

FIG. 2 shows, diagrammatically, a plunger mechanism illustrating the invention.

DETAILED DESCRIPTION OF THE PREFERRED EMBODIMENT

The known plunger operating mechanism comprises a cylinder 2 supporting a housing 4. Mounted for reciprocating movement in the cylinder 2 is a piston 6 carrying a hollow actuating rod 8 which passes through a bearing 10 in a lower end portion 12 of the housing 4. A cooling tube 14 is secured in a lower end portion 16 of the cylinder 2, and extends slidably through the piston 6 through a seal 18.

The actuating rod 8 is adapted to support a parison forming plunger (not shown) by means of a plunger mounting 20; it will be noted that cooling air may be passed to the plunger through the cooling tube 14 and the interior of the hollow actuating rod 8.

Secured in an upper portion 22 of the housing 4 is a sleeve member 24 which extends downwards in the housing 4 around the actuating rod 8. Slidably mounted on the sleeve member 24 is a flanged sleeve 26 having an outwardly extending flange 28. A powerful spring 30 is compressed between the flange 28 and the lower end portion 12 of the housing 14. A spacer 32 is slidably mounted on the rod 8 and is supported by a stirrup 34 of the sleeve 26, being attached to the sleeve 26 by portions (not shown) which pass through slots in the sleeve member 34. A further spacer 36 surrounds the rod 8 and abuts against the end portion 12.

FIG. 1 shows the plunger operating mechanism with the piston 6 in its uppermost, pressing, position. In the operation of the mechanism, starting from this position, when the parison has been formed, the parison mould is opened, and the piston 6 and plunger are moved into a lower most, invert, position to enable the parison to be removed from the parison moulding station without fouling the plunger. This is achieved by the admission of air at a high pressure into the upper portion of the cylinder 2, moving the piston 6 downwardly until the plunger mounting 20 contacts spacer 32 on the stirrup 34 of the flanged sleeve 26 and moving the flanged sleeve 26 downwardly against the spring 30 until further downward movement is prevented by the stirrup 34 of the sleeve 26 abutting against the spacer 36.

The pressure above the piston 6 is then reduced, allowing the spring 30 is reassert itself to return the sleeve 26 to the position shown in FIG. 1 thus to move the piston, by pressure exerted through the stirrup 34 and the spacer 32 by the plunger mounting 20 into an intermediate, loading, position in which the plunger is correctly positioned with respect to the parison mould for the mould to receive a gob of glass.

Once glass has been loaded into the parison mould air under pressure is admitted to the lower part of the cylinder 2, and the piston is moved to an upper end portion of the cylinder 2 so that the piston 6 and the plunger are moved back into their uppermost, pressing position.

When the parison mould is changed, it is frequently necessary to adjust the invert and loading positions of the piston, and thus of the plunger. This entails replacing the spacer 32 with a further spacer of the required dimensions to determine the new loading and invert positions which requires extracting the spacer 32 from within the sleeve 24. It will be seen that dismantling the mechanism as a whole requires removal of the flange 28 from confining the spring 30, which is under compression and very powerful. This is a somewhat difficult operation and requires use of a special tool to maintain compression of the spring 30 and to prevent possible injury to the operator by the uncontrolled expansion of the spring.

In FIG. 2 is shown the preferred embodiment of a plunger mechanism incorporating the invention.

This mechanism resembles the known mechanism in many respects and comprises a cylinder 102 supporting a housing 104. Mounted for reciprocating movement in the cylinder 102 is a piston 106 carrying a hollow actuating rod 108 which passes through a bearing 110 in a lower end portion 112 of the housing 104. A cooling tube 114 is secured in a lower end portion 116 of the cylinder 102 and extends slidably through the piston 106 through a seal 118.

The actuating rod 108 is adapted to support a parison forming plunger (not shown) by means of a plunger mounting 120. The cooling tube 114 corresponds in operation to the cooling tube 14 of the previously described mechanism.

Secured in an upper end portion 122 of the housing 104 is a sleeve member 124 which serves to guide the plunger mounting 120 on downward movement of the piston 106.

Positioned in a lower end portion of the cylinder 102 is a positioning unit 140.

The unit 140 comprises a cup-shaped base member 146 having an outwardly extending annular flange 148 and an aperture 150 by which it is located on the tubular member 114. A sleeve 152, which also surrounds the member 114 extends upwardly from the base member 146 and screws 142 pass through the base member 146 into the sleeve 152. A downwardly facing cup-shaped stop member 154 also slidably surrounds the member 114 and comprises towards an upper end an outwardly extending annular flange 156 which faces the flange 148. Four bolts 158 (two of which are shown) have heads 160 and pass through holes 162 in the flange 148 and holes 164 in the flange 156, the bolts 158 are fixed with respect to the flange 156 by nuts 166 but are slidable through the holes 162. Spring washers 168 surround the sleeve 152 and urge the stop member 154 upwardly away from the base member 146.

It will be seen that the positioning unit 140 can be removed from the cylinder 2 as a unit without releasing the spring washers 168: further by choice of the washers 168 the force required to move the stop member 154 towards the base member 146 can be adjusted: the lower most position of the stop member 154 is determined by an upper face 170 of the sleeve 152—the uppermost position of the stop member 154 can be adjusted by adjustment of the nuts 166 on the bolts 158.

FIG. 2 shows the plunger operating mechanism with the piston 106 in its uppermost, pressing, position. In the operation of the mechanism, starting from this position when the parison has been formed, the parison mould is opened, the piston 106 and the plunger are moved into their lower most, invert, position in which the parison can be removed without fouling the plunger. Air under high pressure is admitted to the upper portion of the cylinder 102, moving the piston 106 downwardly, until it contacts the stop member 154, the pressure being sufficient to move the stop member 154 further downwardly against the spring washers 168 until further downward movement is prevented by engagement of the member 154 with the uppermost face 170 of the sleeve 152.

The pressure above the piston 106 is then reduced, allowing the spring washers 168 to reassert themselves and to move the stop member 154 upwards by the amount allowed by the bolts 158 and thus to move the piston 106 and the plunger into an intermediate, loading, position in which the plunger is correctly positioned with respect to the parison mould for the mould to receive a gob of glass.

Once glass has been loaded into the parison mould further air under pressure is admitted below the piston 106 and the piston 106 is moved to an upper end portion of the cylinder 102 so that the piston 106 and the plunger are in their uppermost, pressing, positions.

From what has been said it will be understood that replacement and adjustment of the positioning unit 140, as it can be removed as a unit from the cylinder 102, is considerably more convenient than the necessary adjustment of the prior art mechanism. The unit 140 can be preset, remote from the plunger mechanism, and is adjustable for a range of loading positions.

It will be understood that, if desired, a similar positioning unit could be arranged in the housing 104 rather than in the cylinder 102, and that disassembly of the plunger operating mechanism provides no problems with expansion of powerful springs as is involved in the existing mechanism.

While the plunger mechanisms have been described as operating with the plunger moving upwardly to perform its pressing operation, it will be understood that they could, if desired, be arranged to operate with a downward movement.

I claim:

1. A plunger operating mechanism for a parison forming plunger of a glassware forming machine comprising
    a cylinder;
    a piston operating in the cylinder and carrying an actuating rod extending upwardly from the cylinder and supporting a parison forming plunger;
    a positioning unit located in a lower end portion of the cylinder and comprising spring means and a stop member capable of limited axial movement against the spring means; and
    means for moving the piston in the cylinder between an uppermost, pressing position in which the piston is in an upper end portion of the cylinder, an intermediate, loading, position, in which the piston abuts against the stop member without compression of the spring means and a lowermost, invert position in which the stop member is moved downwardly by the piston through said limited axial movement;
    the positioning unit being removable, without disassembly thereof from the cylinder.

2. A mechanism according to claim 1 wherein the stop member of the positioning unit is cup shaped and the spring means surrounds a central bush of the positioning unit.

3. A mechanism according to claim 2 wherein the positioning unit comprises a cup shaped base member and stop means secured in both the base member and the stop member securing the base member and the stop member together while permitting said limited axial movement of the stop member with respect to the base member.

* * * * *